(12) United States Patent
Lin et al.

(10) Patent No.: US 7,274,831 B2
(45) Date of Patent: Sep. 25, 2007

(54) HIGH QUALITY ANTI-ALIASING

(75) Inventors: Zhouchen Lin, Beijing (CN); Jian Wang, Beijing (CN); Haitao Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 10/406,517

(22) Filed: Apr. 3, 2003

(65) Prior Publication Data

US 2004/0197028 A1    Oct. 7, 2004

(51) Int. Cl.
*G06K 9/64* (2006.01)

(52) U.S. Cl. .............. 382/279; 382/260; 382/266; 382/280; 358/3.26; 358/3.27

(58) Field of Classification Search .............. 382/260, 382/266, 269, 275, 279, 274, 79, 280, 282; 358/3.26, 3.27, 520, 463
See application file for complete search history.

(56) References Cited

U.S. PATENT DOCUMENTS

| | | | | |
|---|---|---|---|---|
| 4,623,923 A * | 11/1986 | Orbach | | 348/625 |
| 4,808,984 A * | 2/1989 | Trueblood et al. | | 345/214 |
| 4,969,043 A * | 11/1990 | Pothier | | 348/835 |
| 5,072,314 A * | 12/1991 | Chang | | 359/559 |
| 5,638,465 A * | 6/1997 | Sano et al. | | 382/281 |
| 5,651,071 A * | 7/1997 | Lindemann et al. | | 381/314 |
| 5,729,140 A * | 3/1998 | Kruger et al. | | 324/309 |
| 5,734,739 A * | 3/1998 | Sheehan et al. | | 382/128 |
| 5,822,465 A | 10/1998 | Normile et al. | | |
| 5,901,252 A * | 5/1999 | Kawakami et al. | | 382/276 |
| 6,016,356 A * | 1/2000 | Ito et al. | | 382/132 |
| 6,020,979 A * | 2/2000 | Zeck et al. | | 358/1.9 |
| 6,208,139 B1 * | 3/2001 | Foo et al. | | 324/309 |
| 6,226,636 B1 | 5/2001 | Mohamed et al. | | |
| 6,344,640 B1 * | 2/2002 | Rhoads | | 250/201.9 |
| 6,636,635 B2 * | 10/2003 | Matsugu | | 382/218 |
| 6,700,672 B1 * | 3/2004 | Jones et al. | | 358/1.1 |
| 6,716,175 B2 * | 4/2004 | Geiser et al. | | 600/450 |

(Continued)

FOREIGN PATENT DOCUMENTS

EP    0 865 168    9/1998

(Continued)

OTHER PUBLICATIONS

Dey, et al., "A Fast Algorithm for Computing the Euter Number of an Image and its VLSI Implementation", IEEE; 13th International Conference on VLSI Design (Jan. 2003).
Foley, J.D. et al., "Computer Graphics Principles and Practice. Passage Text," 1996, COmputer Graphics. Principles and Practice, Reading, Addision Wesley, U.S., pp. 965-979.

(Continued)

*Primary Examiner*—Yosef Kassa
(74) *Attorney, Agent, or Firm*—Banner & Witcoff, Ltd.

(57) ABSTRACT

An antialiasing method and apparatus suitable for antialiasing a variety of image types, including fonts, large images, and very small images. The antialiasing technique may represent the edge of a line, curve or region as a series of line segments. These line segments are then traversed to convolute the line segment approximating the contours of the image with a desired filter function. A filter function is also disclosed for antialiasing the edges of a line, curve or region, which may be employed when the edge is represented by a series of line segments. The antialiasing filter tends to centers the spectral energy of an image on the sampled area.

22 Claims, 10 Drawing Sheets

U.S. PATENT DOCUMENTS 6,798,910 B1 * 9/2004 Wilson .................. 382/199

FOREIGN PATENT DOCUMENTS

EP          1 158 456      11/2001
WO      WO 02/077870      10/2002

OTHER PUBLICATIONS

Kajiya, J. and Ullner, M.: "Filter high quality text for display on raster scan devices," Computer Graphics, vol. 15, No. 3, Aug. 1981, pp. 7-15.

Feibush, E.A., et al.: "Synthetic texturing using digital filters," Computer Graphics, New York, NY, U,S., vol. 14, No. 3, Jul. 1980, pp. 294-301.

Foley, J.D., et al., "Computer Graphics Principles and Practice. Passage Text," 1996, Computer Graphics. Principles and Practice, Reading, Addison Wesley, U.S., pp. 617-647.

Foley, J.D., et al., "Computer Graphics Principles and Practice. Passage Text," 1996, Computer Graphics. Principles and Practice, Reading, Addison Wesley, U.S., pp. 132-143.

CN Office Action dated Mar. 9, 2007, CN Appln. 200410028635.9, English Translation only.

* cited by examiner

FIGURE 13C abcdefghijklmnopqrstuvwxyz
abcdefghijklmnopqrstuvwxyz
abcdefghijklmnopqrstuvwxyz
abcdefghijklmnopqrstuvwxyz
abcdefghijklmnopqrstuvwxyz
abcdefghijklmnopqrstuvwxyz

FIGURE 13D

HIGH QUALITY ANTI-ALIASING

FIELD OF THE INVENTION

The present invention is related to an anti-aliasing technique for rendering images. Various embodiments of the invention have particular application to the rendering of flat-shaded graphical objects, such as fonts, curves and regions.

BACKGROUND OF THE INVENTION

Modern computers have become extremely powerful, and can make thousands of calculations per second. These powerful computing resources frequently are employed to display or "render" detailed images on a monitor or television. For example, computers are used to generate realistic images for movies, complex animation for games, and even pictures saved from a camera. To generate these images, a computer may calculate and plot lines, curves, and regions. While a computer may calculate smooth and continuous lines, curves and regions, however, these lines, curves and regions must still be displayed on a monitor or television that has discrete picture elements or "pixels."

Figure 1A:
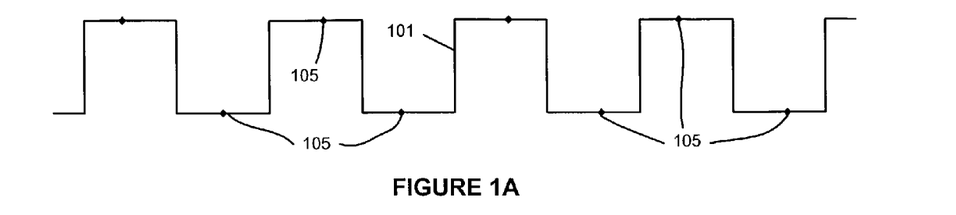
FIGS. 1A and 1C show contours having different feature frequencies.
Figure 1B:
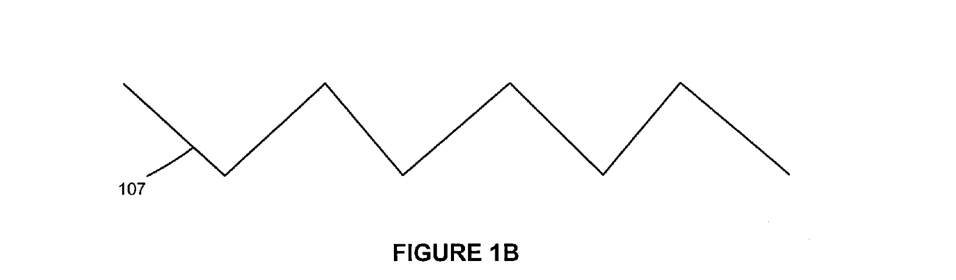
FIGS. 1B and 1D illustrate contours produced by sampling the contours illustrated in FIGS. 1A and 1C, respectively.
Figure 1C:
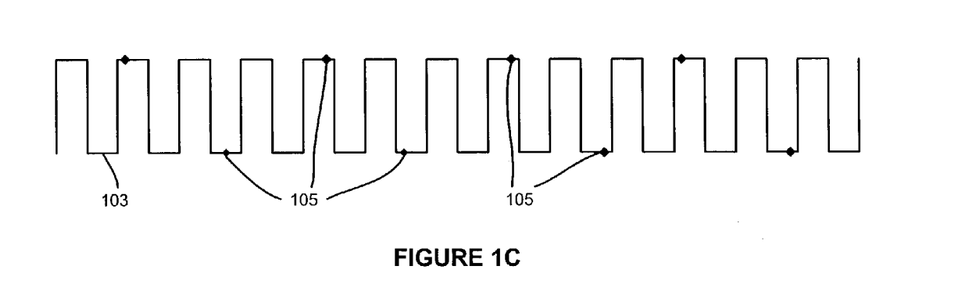

Thus, the smooth lines, curves or regions generated by a computer cannot actually be displayed or "rendered" just as they are generated. They must instead be sampled at discrete locations corresponding to individual pixels. If the features of the line, curve or region occur more frequently than the line, curve or region is sampled for the pixels, however, the sampled image data will not accurately reflect the original generated image data. For example, FIGS. 1A and 1C illustrate two different contours 101 and 103 that may be generated by a computer. As seen in these figures, the features of contour 101 occur more frequently than the features of contour 103. The contours 101 and 103 are sampled at discrete locations 105, to produce corresponding sampled contours 107 and 109 shown in FIGS. 1B and 1D, respectively.

Figure 1D:
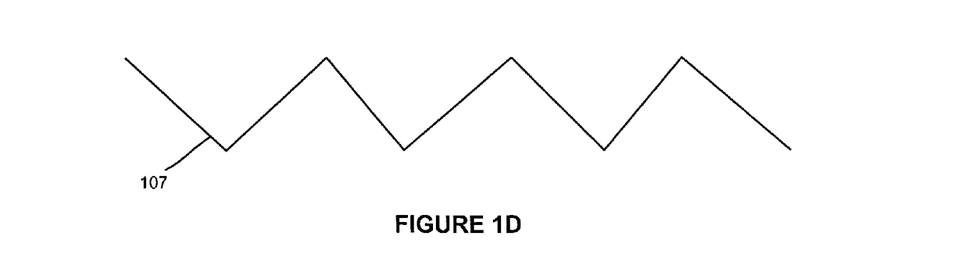

Because the samples 105 of the contour 103 occur at less than half of the frequency as the features of the contour 103 occur, the features of sampled contour 109 are much different than the frequency of the original contour 105. Instead, the sampled counter 109 is identical to the sampled contour 107, even though the appearance of the original contour 101 is much different than the appearance of the original contour 103. In order to accurately sample a line, curve or region, the sample rate must be more than twice the frequency of the features of the line, curve or region being sampled. The sample rate is limited, however, by the number of pixels available (or "resolution") available on the relevant display device.

Figure 2A:
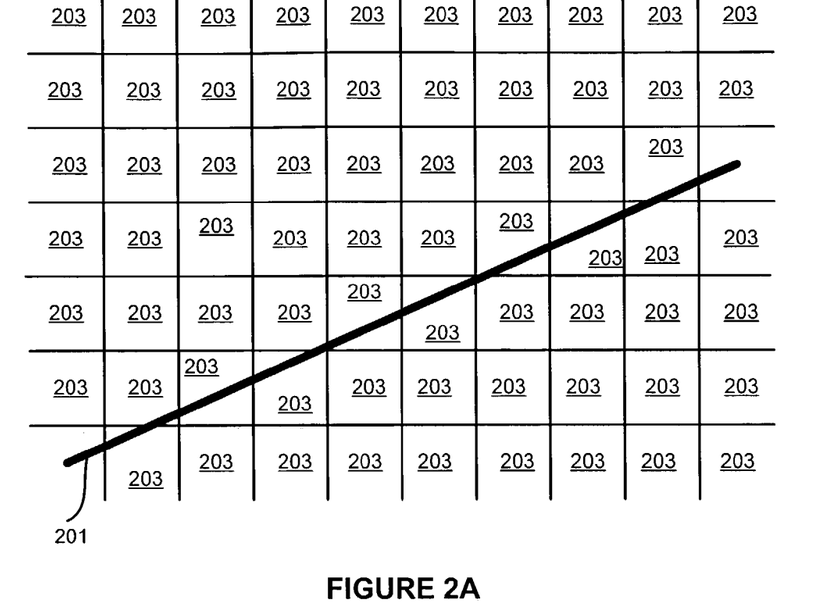
FIG. 2A shows a calculated line superimposed on an array of pixels.
Figure 2B:
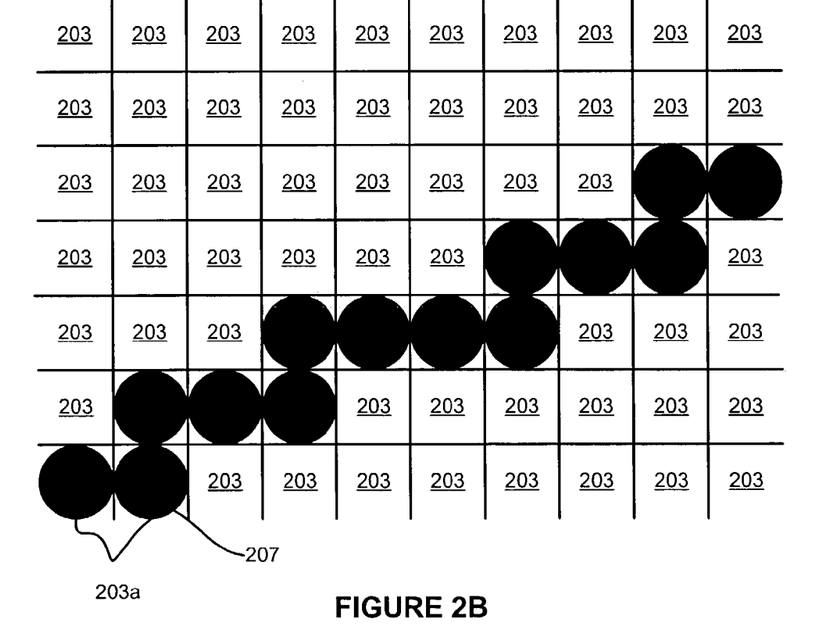
FIGS. 2B and 2C illustrate the activation of pixels to render the calculated line shown in FIG. 2A using different rendering techniques.
Figure 2C:
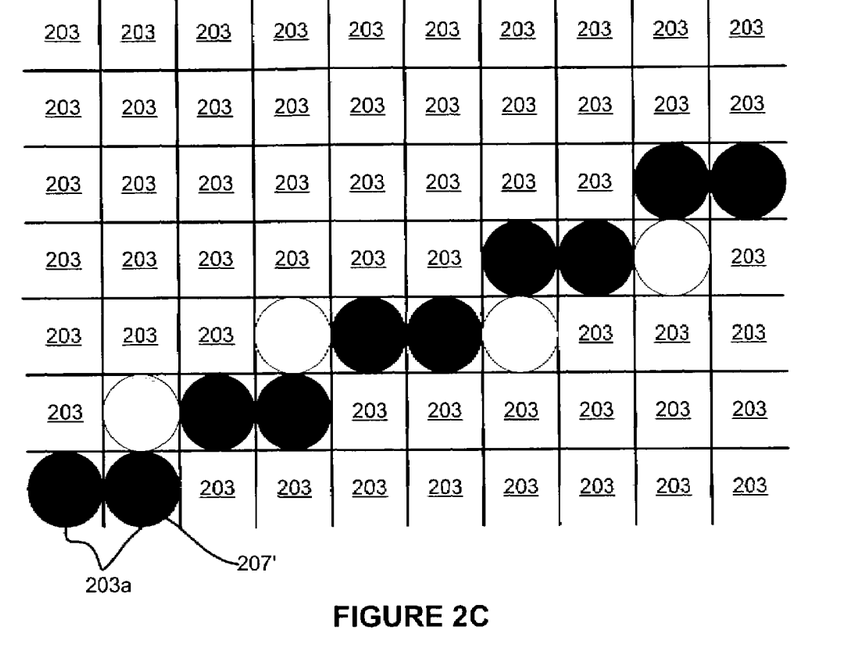

This aliasing problem is graphically demonstrated in FIGS. 2A and 2B. As seen in FIG. 2A, a computer may generate a line 201 having a specified width and a specified direction or slope. The generated line 201 will be calculated so as to correspond to specific pixels 203 of a display 205. If each pixel 203a corresponding to the line 201 is activated, however, then the displayed line 207 will be much thicker than the generated line 201 as shown in FIG. 2B. Moreover, the displayed line 207 will appear very jagged to a viewer, quite unlike the smooth generated line 201.

Figure 3:
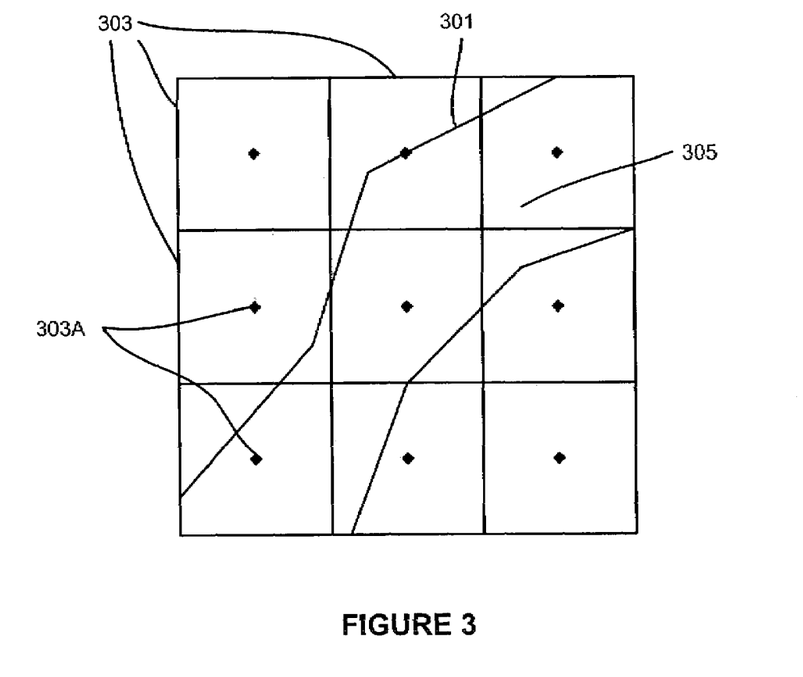
FIG. 3 illustrates a revolutionary filter mask for prefiltering a line, curve or region using an antialiasing technique.

To address this problem, various anti-aliasing techniques have been developed to control the appearance of pixels corresponding with a line, curve or region, so that the edges of the line, curve or region appear more blurred to an observer. For example, as shown in FIG. 3, an anti-aliasing technique might give some of the pixels 203 corresponding to the line 201 a lighter appearance. With some anti-aliasing techniques, the color or intensity of a pixel (that is, the value of a pixel) is assigned based upon the amount of overlap between the pixel and the generated line, curve or region. Moreover, with some of these anti-aliasing techniques, a corresponding pixel might not even be activated if there is insufficient overlap of the pixel with the generated line, curve or region.

A variety of methods have been developed to determine the value assigned to a pixel based upon its overlap with a generated line, curve or region. Some methods determine a pixel's value by dividing the pixel into a number of subpixels, and then determining how many subpixels are intersected by the generated line, curve or region. For example, a pixel having only three subpixels intersected by the generated line, curve or region might be assigned a lower value than a pixel having seven subpixels intersected by the generated line, curve or region. Some anti-aliasing methods will additionally weight each subpixel, so that the subpixels close to the center of a pixel have more influence on the pixel's assigned value than subpixels further away from the pixel's center.

Still other anti-aliasing techniques determine the value of a pixel based upon the total amount of overlap of the pixel with the generated line, curve or region. More particularly, these techniques convolute a continuous weighting function, referred to as a "filter" function, with the area of one or more pixels overlapping generated line, curve or region. The generic convolution equation is given as follows:

$$c(\xi) = \int_{\infty}^{-\infty} h(\xi - x) y(x) \, dx$$

where $h(\xi-x)$ is the convolution kernel and $y(x)$ is the function being convolved. For antialiasing techniques, the function being convolved $y(x)$ is the image function generating the line, curve or region, while the convolution kernel $h(\xi-x)$ is a filter function that is multiplied with the pixel value. The product of the filter function and the image function are then integrated over a predetermined area referred to as the filtering mask. This convolution process is referred to as prefiltering because high frequency features of the image data are filtered from the image data before it is displayed.

A variety of different filtering functions have been employed for antialiasing. For example, box functions, conical functions and Gaussian functions are all commonly employed for antialiasing. Some filtering functions, such as conical and Gaussian functions, are two-dimensional. With these functions, the height of the filter function varies the weight multiplied with the pixel value over different locations within the pixel. A two-dimensional circular or revolutionary filter function may thus provide greater weight to the overlap of a pixel with a generated line, curve or region occurring at the center of the pixel than an overlap occurring at the edge of a pixel.

In addition to using different filter functions, various antialiasing techniques may also employ different filter masks. For example, some antialiasing techniques may employ a square filter mask that covers one or more pixels. Other antialiasing techniques may alternately employ a revolutionary filter mask having a diameter of one, two, three or four or more times the width of a pixel. FIG. 3 illustrates a region 301 that is rendered by a group of pixels 303, each pixel 303 have a center 303A. It also illustrates a revolutionary convolution or filter mask 305 having a diameter two times the width of a pixel 303. As seen in this figure, if the mask 305 is centered on a pixel, it will reach the center of each immediately adjacent pixel.

While a variety of antialiasing techniques have been developed, each of these techniques is usually only suitable for the particular type of image data for which they have been developed. For example, antialiasing techniques developed to render small polygons are typically not very suitable for rendering curves or fonts. Similarly, antialiasing techniques specialized to render curves are not very suitable for rendering polygons or fonts, while antialiasing techniques designed to render fonts are typically not very suitable for rendering polygons or curves. Accordingly, there is a need for an antialiasing technique that will provide good antialiasing for a variety of image data types.

BRIEF SUMMARY OF THE INVENTION

Advantageously, various embodiments of the invention provide an antialiasing method and apparatus suitable for antialiasing a variety of image types, including fonts, large images, and very small images. More particularly, some embodiments of the invention provide a technique for representing the edge of a line, curve or region as a series of line segments. According to the antialiasing technique of these embodiments, these line segments are traversed to convolute the line segment approximating the contours of the image with a desired filter function.

Still other embodiments of the invention relate to a filter for antialiasing the edges of a line, curve or region, which may be employed when the edge is represented by a series of line segments. With these embodiments of the invention, the antialiasing filter tends to centers the spectral energy of an image on the sampled area.

DETAILED DESCRIPTION OF THE INVENTION

Introduction

The antialiasing technique according to various embodiments of the invention creates filtered image data by prefiltering original image data. The embodiments of the invention employ two components. The first component is the filtering function used to weight the original image data. As will be discussed in detail below, the filtering functions employed by various embodiments of the invention tend to optimally center spectral energy of sampled image data on an area in a spectral domain corresponding to the sample spacing of the sampled image data in the spatial domain. The second component is the rendering algorithm that applies the filter function to original image data in order to filter that data. Each of these components will be discussed in detail below.

Operating Environment

As will be appreciated by those of ordinary skill in the art, the antialiasing technique according to various embodiments of the invention can be implemented using hardware, software, firmware, or a combination thereof. For example, various embodiments of the invention can be implemented by functional modules that perform the operations of the antialiasing technique. Each of the modules may be formed solely from analog or digital electronic circuitry. As will be appreciated by those of ordinary skill in the art, however, the modules may also be formed using programmable electronic circuitry that has been programmed with executable instructions, such as found in conventional programmable computing devices.

More particularly, anti-aliasing systems according to various embodiments of the invention may be described in the general context of computer-executable instructions, such as program modules, executed by one or more programmable computing devices. Generally, program modules may include routines, programs, objects, components, data structures, etc. that perform particular tasks or implement particular abstract data types. Typically the functionality of the program modules may be combined or distributed as desired in various embodiments.

Figure 4:
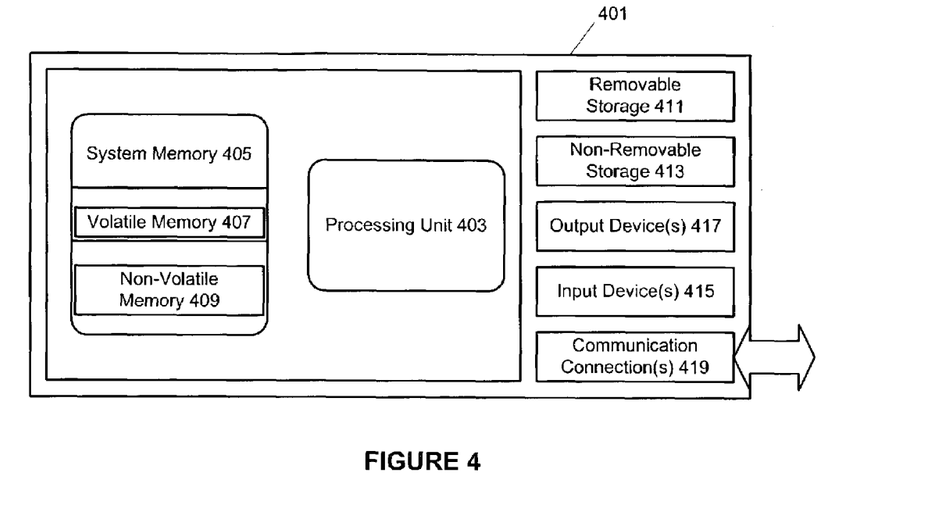
FIG. 4 illustrate a computing device for implementing an anti-aliasing technique according to various embodiments of the invention.

Because various embodiments of the invention may be implemented using programmable computer devices programmed with software, it may be helpful for a better understanding of the invention to briefly discuss the components and operation of a typical programmable computing device (hereafter referred to simply as a computer) on which various embodiments of the invention may be employed. FIG. 4 illustrates an example of a computing device 401 that provides a suitable operating environment in which various embodiments of the invention may be implemented. This operating environment is only one example of a suitable operating environment, however, and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing device 401 typically includes at least some form of computer readable media. Computer readable media can be any available media that can be accessed by the computing device 401. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, punched media, holographic storage, or any other medium which can be used to store the desired information and which can be accessed by the computing device 401.

Communication media typically embodies computer readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

With reference to FIG. 4, in its most basic configuration the computing device 401 typically includes a processing unit 403 and system memory 405. Depending on the exact configuration and type of computing device 401, the system memory 405 may include volatile memory 407 (such as RAM), non-volatile memory 409 (such as ROM, flash memory, etc.), or some combination of the two memory types. Additionally, device 401 may also have mass storage devices, such as a removable storage device 411, a non-removable storage device 413, or some combination of two storage device types. The mass storage devices can be any device that can retrieve stored information, such as magnetic or optical disks or tape, punched media, or holographic storage. As will be appreciated by those of ordinary skill in the art, the system memory 405 and mass storage devices 411 and 413 are examples of computer storage media.

The device 401 will typically have one or more input devices 415 as well, such as a keyboard, microphone, scanner or pointing device, for receiving input from a user. The device 401 will typically also have one or more output devices 417 for outputting data to a user, such as a display, a speaker, printer or a tactile feedback device. For example, the output device 417 may include a cathode ray tube display, a plasma display, a liquid crystal display, an organic material display or any other type of display. As will be appreciated by those of ordinary skill in the art, each of these types of displays will render images by activating discrete pixels. Other components of the device 401 may include communication connections 419 to other devices, computers, networks, servers, etc. using either wired or wireless media. As will be appreciated by those of ordinary skill in the art, the communication connections 419 are examples of communication media. All of these devices and connections are well know in the art and thus will not be discussed at length here.

Anti-Aliasing Tool

Figure 5:
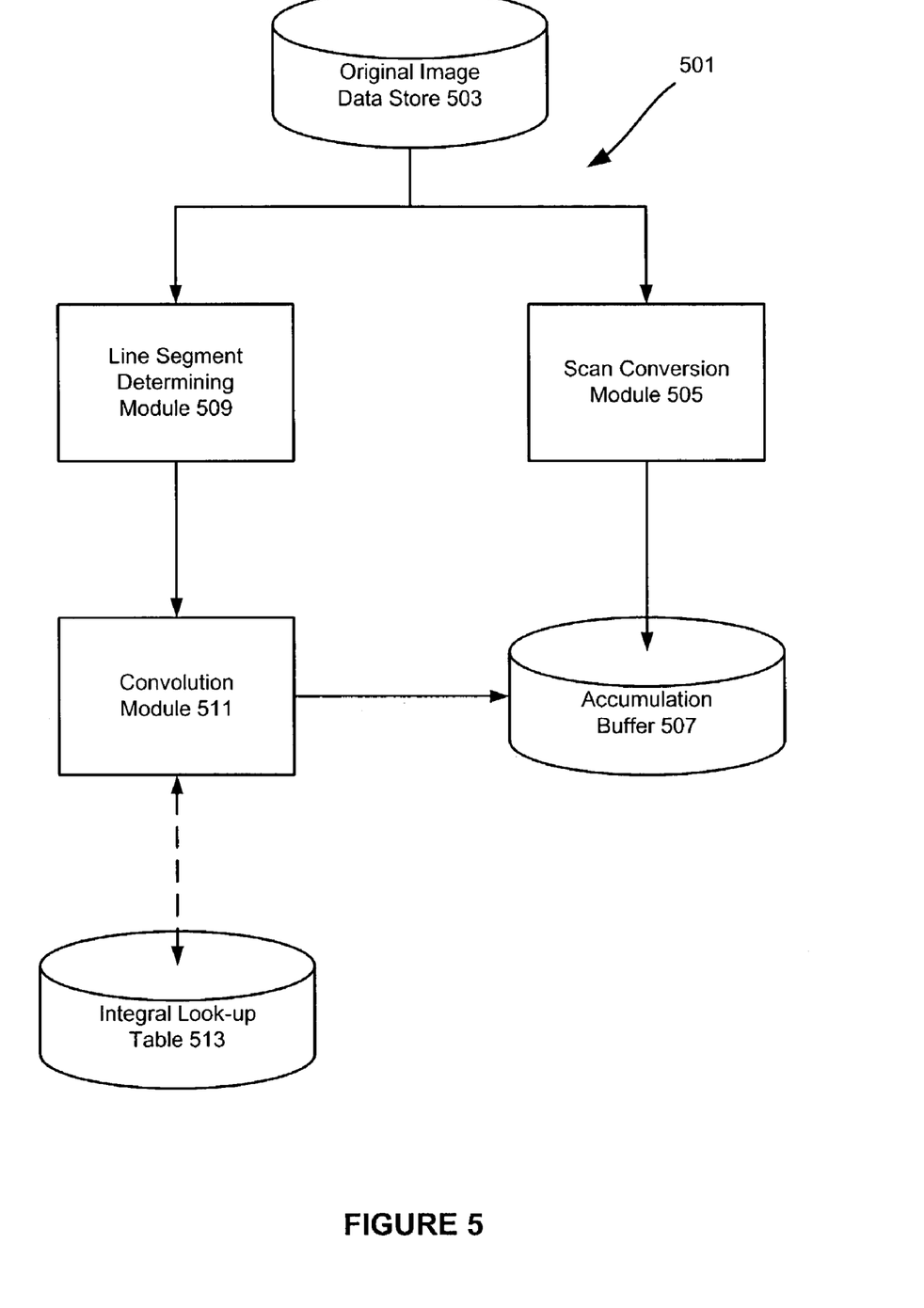
FIG. 5 illustrates an anti-aliasing system that implements an anti-aliasing technique according to various embodiments of the invention.

FIG. 5 illustrates an anti-aliasing tool 501 for implementing an anti-aliasing technique according to various embodiments of the invention. The anti-aliasing tool 501 includes an original image data store 503, a scan conversion module 505, an accumulation buffer 507 and a line segment determining module 509. As will be discussed in detail below, the original image data store 503 stores the original image data to be rendered using an anti-aliasing technique according to the embodiment of the invention. The original image data may be stored in any suitable form, such as in the form of one or more mathematical equations describing a region, curve or line to be rendered. For example, if the anti-aliasing technique is being used to render a straight line, then the original image data may be the equation $y=mx+c$, where m is the slope of the line and c is the offset of the line.

As will be appreciated by those of ordinary skill in the art, the original image data can represent a line, curve or region. When the original image data represents a large region (for example, a region having a width greater than the diameter of the antialiasing filter mask employed to anti-alias the region), however, only the edges of the region will need to be anti-aliased. More particularly, if the image data represents a large region, the only distinct features of the region that will need to be anti-aliased are along the edges of the region. Thus, only the edges of the large region need to be clearly rendered in order to distinguish the region from adjacent lines, curves and regions. The remaining portion of the region that falls outside of the diameter of the antialiasing filter mask can be more quickly and efficiently rendered directly from the original image data without applying anti-aliasing filtering.

Accordingly, when the original image data represents a large region, the scan conversion module 505 generates an initial pixel value for each pixel in a display. More particularly, the scan conversion module 505 employs a scan conversion process to generate initial pixels values corresponding to the region defined by the original image data. The scan conversion process may be, for example, a bi-level scan conversion process. The bi-level scan conversion process assigns a pixel a first value if the center of the pixel falls within the region, and assigns the pixel a second value if the center of the pixel falls outside of the region.

Thus, if the region is a solid black area and the value of a black pixel is designated as "1", those pixels having a center within the region will be assigned a value of "1" while those pixels with centers outside of the region will be assigned a value of "0." It should be noted, however, that some embodiments of the invention may be employed for pixels that can have a range of values, in order to display multiple colors or multiple shades of gray. For these embodiments, the bi-level scan conversion may assign pixels having centers within the region any appropriate value corresponding to the color or the shade of the region. The pixel data generated by the scan conversion module 505 is then stored in the accumulation buffer 507. If, however, the original image data represents a small region or a line or curve without significant depth (that is, with a width that can be encompassed by the diameter of the antialiasing filter mask, then the operation of the scan conversion module 505 may be omitted.

As will be discussed in detail below, the line segment determining module 509 breaks the contours of the lines, curves or regions represented by the original image data into discrete line segments approximating the original image data. For example, if the original image data represents a region in the shape of a circle, then the line segment determining module 509 will create approximate image data in the form of a hexagon, octagon, dodecahedron or other multi-sided polygon approximating the circle. Thus, if the original image data is a thin line or curve, the line segment determining module 509 will generate line segments approximating the contour of the line or curve. Similarly, if the original image data represents a region, the line segment determining module 509 will generate line segments approximating the contour formed by the edges of the region. By approximating the original image data with straight line segments, the line segment determining module 509 allows the convolution process to be simplified.

The anti-aliasing tool 501 also includes a convolution module 511. As will be explained in detail below, the convolution module 511 convolutes the antialiasing filter function with the area or "integral region" defined by the filter mask and the line segments generated by the line segment determining module 509 to produce filtered image data. With some embodiments of the invention, the convolution module 511 may determine the convolution of the filter function and the integral region by direct calculation. With other embodiments of the invention, however, the convolution module 511 may determine the convolution of the filter function and the integral region by looking up the values of a convolution from a look-up table 513. Thus, the look-up table 513 may be optionally included with the anti-aliasing system 501, as illustrated by the dotted line in FIG. 5.

The filtered image data calculated by the convolution module 511 is then used to modify or replace the appropriate corresponding pixel values in the accumulation buffer 513. The combination of the initial pixel values and the pixel values based upon the filtered image data is then used to render the desired image.

The Rendering Algorithm

Figure 6A:
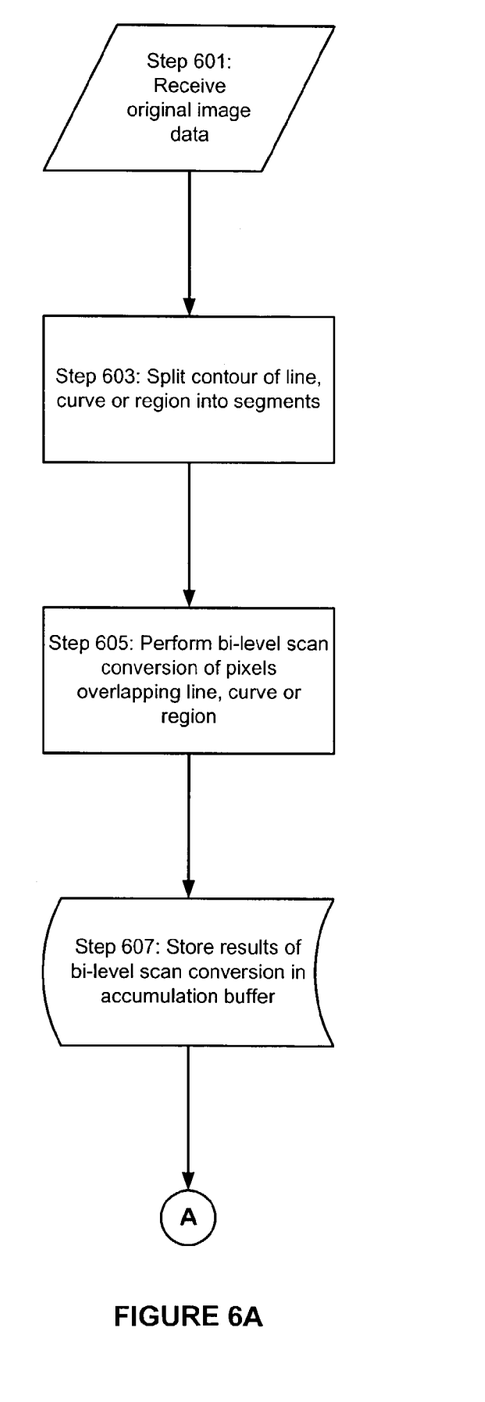
FIGS. 6A and 6B illustrate a method that implements an anti-aliasing technique according to various embodiments of the invention.
Figure 6B:
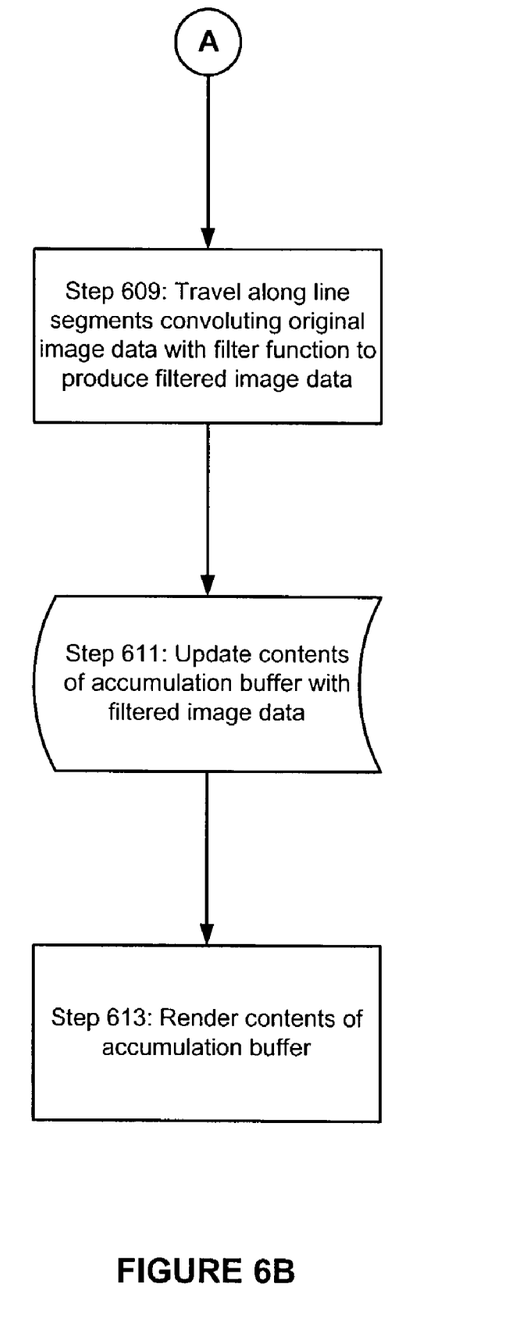

Referring now to FIGS. 6A and 6B, a rendering algorithm according to various embodiments of the invention will now be explained in greater detail. As shown in step 601, the anti-aliasing tool 501 receives the original image data into the original image data store 503. Next, in step 603, the line segment determining module 509 generates approximate image data corresponding to the original image data. More particularly, the line segment determining module 509 creates line segments approximating the contours of the lines, curves or regions represented by the original input data.

Figure 7:
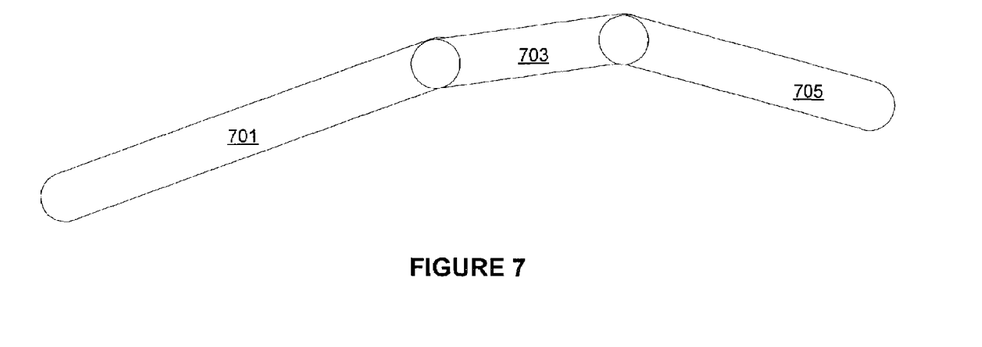
FIG. 7 illustrates an example of a contour divided into line segments by an anti-aliasing technique according to various embodiments of the invention.

Any of a variety of well-known techniques may be employed to generate line segments approximating the lines, curves or regions represented by the original image data. For example, if the original image data defines Bezier curves (as might be used to represent a character in a TrueType font), then de Casteljau's algorithm can be employed to create line segments approximating the Bezier curves. Thus, the line segment determining module 509 may generate a series of straight line segments 701-705 corresponding to a curved contour, as illustrated in FIG. 7.

In step 605, the scan conversion module 505 performs a scan conversion process on the original image data. More particularly, if the depth of curve, line or region is relatively large (that is, if the depth of the curve, line or region is greater than the diameter of the mask for the antialiasing filter), then the scan conversion module 505 performs a bi-level scan conversion process on the original image data. For example, if the original image data describes a font or polygon having a large depth, then the scan conversion module 505 applies the bi-level scan conversion process to the original image data. The scan conversion module 505 assigns a first value to those pixels having centers that fall within the curve, line or region described by the original image data, and assigns a second value to those pixels having centers that fall outside of the curve, line or region.

For example, if the image data describes a polygon region that is solid black, then the scan conversion module 505 may assign those pixels having centers falling within the region a value of "1," (that is, the darkest value of the pixel), and assign the remaining pixels a value of "0" (that is, the lightest value of the pixel). For alternate embodiments of the invention, however, the scan conversion module 505 may assign other values to pixels having a center within the region and pixels having a center outside of the region. For example, if the pixels can display different colors, the module 505 may assign those pixels having centers within the region a value corresponding to the color of the region. Thus, using a bi-level scan conversion process, the scan conversion module 505 generates pixel values corresponding to the overall shape of large lines, curves and regions described by the original image data.

In the illustrated embodiment, the mask of the antialiasing filter is approximately two pixels. For example, if the antialiasing filter employs a square mask, then the mask may cover a 2×2 pixel area. If the antialiasing filter employs a rotational filter, then the mask may have a radius of 1 pixel. Filters of this size require handling fewer details in the convolution than a larger filter and allow the related integrals to be computed exactly, thereby simplifying the convolution calculations. Various alternate embodiments of the invention, however, may use a smaller or larger mask area. Also, various embodiments of the invention may employ both positive and negative lobes.

Once the scanned image data has been written to the accumulation buffer 513 in step 607, then the contours of the line, curve or region described by the original image data are filtered. More particularly, in step 609, the integration module 509 travels along the line segments generated by the line segment determining module 507 to convolute the contours of the approximate image data with a desired filter function. Thus, the integration module 509 travels along the line segments of the approximate image data to integrate the area bounded by the filter mask and the line segments with the filter function. With some embodiments of the invention, the convolution values are determined by looking up previously calculated values from a look-up table 511. With other embodiments of the invention, however, the convolution values may be determined by performing a real-time calculation of the convolution.

In step 611, the filtered image data is stored in the accumulation buffer 513 with the scanned image data. The filtered image data and the scanned imaged data can then be rendered in step 613. With some embodiments of the invention, the filtered and scanned image data may be rendered in groups corresponding to the line segments generated by the line segment determining module 507, so that the rendering of the curve, line or region occurs sequentially. With other embodiments of the invention, however, the filtered image data may be rendered on a real-time as the approximate image data has been filtered.

Figure 8:
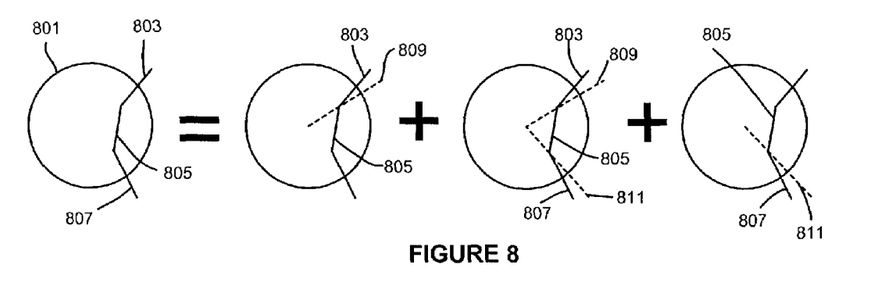
FIGS. 8 and 10 illustrate the equivalence of areas encompassed by the intersection of different line segments and a revolutionary filter employed by an anti-aliasing technique according to various embodiments of the invention.

As noted above, convoluting approximate image data having contours formed of straight line segments with a filter function is much easier than convoluting the original image data. In some situations, however, a convolution mask may encompass two or more vertices between different line segments. In these situations, the integral for the area and thus the convolution may be difficult to calculate. Accordingly, various embodiments of the invention determine the convolution of areas containing two or more line segment vertices by breaking those areas up into smaller, more easily calculated areas. First, an area with multiple vertices is divided by lines extending from the center of the convolution mask through each vertex. For example, FIG. 8 illustrates an area bounded by a revolutionary convolution mask 801, a first line segment 803, a second line segment 805, and a third line segment 807. As seen in this figure, this area can be divided into three smaller areas.

The first smaller area is bounded by the revolutionary convolution mask 801, the first line segment 803, and a line 809 extending from the center of the convolution mask 801 through the vertex of line segment 803 and the line segment 805. The second smaller area then is bounded by the revolutionary convolution mask 801, the line 809 extending from the center of the convolution mask 801 through the vertex of line segment 803 and the line segment 805, and a line 811 extending from the center of the convolution mask 801 through the vertex of line segment 805 and the line segment 807. The third smaller area is bounded by the revolutionary convolution mask 801, the line 811 extending from the center of the convolution mask 801 through the vertex of line segment 805 and the line segment 807, and the line segment 807.

Figure 9A:
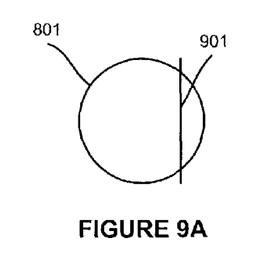
FIGS. 9A-9C illustrate examples of line segments within a revolutionary filter mask with an anti-aliasing technique according to various embodiments of the invention.
Figure 9B:
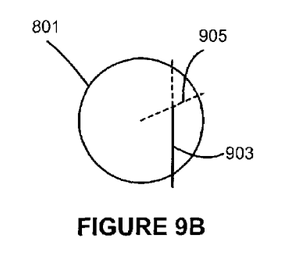

Subdividing areas with multiple vertices in this manner produces three basic types of areas. First, an area without a vertex will not be subdivided, and will continue to be bounded by the convolution mask and a single line segment. For example, as shown in FIG. 9A, the first type of area may be bounded by the revolutionary convolution mask 801 and a single line segment 901. Alternately, an area may be bounded by a line segment and only a single line extending from the center of the convolution mask. Thus, as shown in FIG. 9B, the area may be bounded by the convolution mask 801, a line segment 903, and a single line 905 extending from the center of the convolution mask 801. Lastly, an area may be bounded by a line segment and two lines extending from the center of the convolution mask. For example, as shown in FIG. 9C, an area may be bounded by the convolution mask 801, a line segment 907, a first line 909 extending from the center of the convolution mask 801, and a second line 911 extending from the center of the convolution mask 801.

Figure 9C:
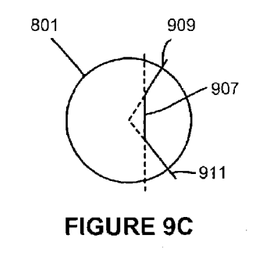
Figure 10:
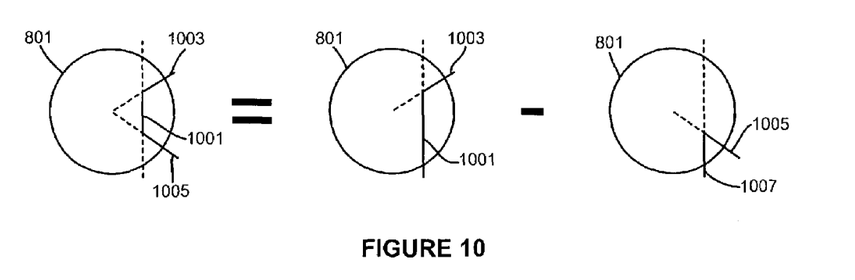

According to various embodiments of the invention, however, the third type of area shown in FIG. 9C may be further divided, in order to simplify calculation of the convolution. More particularly, as shown in FIG. 10, an area bounded by a convolution mask 801, a line segment 1001 and two lines 1003 and 1005 extending from the center of the mask 801 may be formed by subtracting an area bounded by the convolution mask 801, a line segment 1007 and the line 1005 extending from the center of convolution mask 801 from an area bounded by the convolution mask 801, the line segment 1001, and the line 1003. Thus, according to various embodiments of the invention, any integral region encompassed by a convolution mask may be defined by the addition or subtraction of one a basic integral region.

Figure 11:
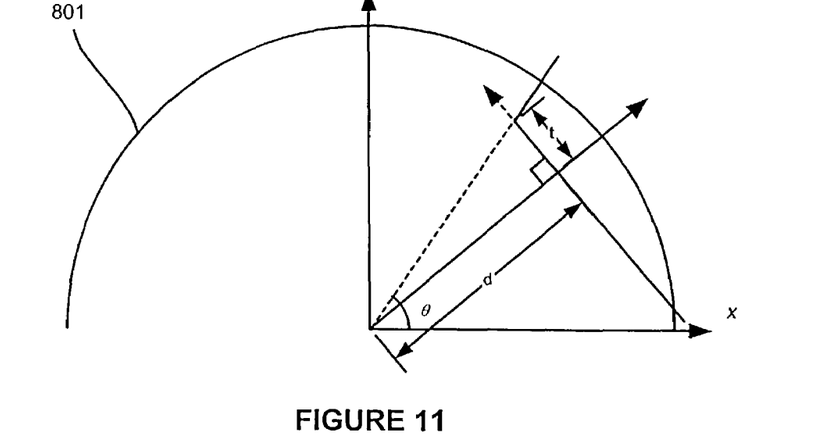
FIG. 11 illustrates the generic calculation of an area encompassed by an intersection of two line segments and a revolutionary filter employed by an anti-aliasing technique according to various embodiments of the invention.

As shown in FIG. 11, this basic integral region can be defined by two variables: the distance d from the center of the convolution mask 801 to the line segment, and the distance t between the intersection of the line segment with the convolution mask 801 and the intersection of the line segment with the line extending from the center of the convolution mask 801. If the mask 801 is a revolutionary mask, then the definition of the basic integral region includes a third variable, $\theta$, which is the polar sweep angle of the line extending from the center of the convolution mask 801. In some circumstances, the vertex of the line extending from the center of the convolution mask and the line segment of a basic integral region will fall upon the center of the convolution mask itself, making the basic integral region difficult define. When this occurs, however, the vertex can be moved slightly from the vertex in order to make the basic integral region easier to define.

The Filter Function

While the rendering technique described above may be employed with any suitable filtering function, various embodiments of the invention employ a filter function that tends to optimally center spectral energy of sampled image data on an area in a spectral domain corresponding to the sample spacing of the sampled image data in the spatial domain. With some embodiments of the invention, the filter function is defined by a spheroidal wave function. With still other embodiments of the invention, however, the filter function is defined by a polynomial that can be more easily calculated for a variety of integral regions.

It is well known that the spectrum of a sampled continuous signal consists of periods of that continuous signal. Thus, the amount of aliasing in a sample of an area can thus be measured by the energy of the spectrum within a square $\Omega$, where the area of the square $\Omega=[-\Omega, \Omega]\times[-\Omega, \Omega]$ in the spectral domain, where $\Omega=\pi/T$ and T is the sample spacing for the sampled image data in the spatial domain. For the purposes of determining a generalized filtering function, the sample spacing T can be normalized to 1. To minimize aliasing in the signal, the filtering function should optimally center the spectral energy of the data sampled from the signal on the square $\Omega$. It should be noted that, for some embodiments, the filtering function of the invention may not always exactly center the spectral energy of the data sampled from the signal on the square $\Omega$, but may instead tend to center the spectral energy on the square $\Omega$.

With a revolutionary filter $\Gamma_{106}$, for a specific square area $\Omega$, $$\Gamma_\Omega = \int\int_\Omega |[F(I \otimes h)](\omega_x, \omega_y)|^2 d\omega_x d\omega_y$$

while for a generic revolutionary filter $\Gamma$, $$\Gamma = \int\int |[F(Ih)](\omega_x, \omega_y)|^2 d\omega_x d\omega_y$$

a) where stands for a convolution process, [F(g)] is the Fourier transform of the function g, I represents the image data to be antialiased and h is the antialiasing filter. That is, $\int\int |[F(Ih)](\omega_x,\omega_y)|^2 d\omega_x d\omega_y$ is the Fourier transform of the convolution of the image data with the antialiasing filter function. Thus, a filter that optimally centers the spectral energy of the data sampled from the image I on the square $\Omega$ should satisfy:

$$h_l = \underset{h}{\operatorname{argmax}} \frac{\int\int_\Omega |[F(I \otimes h)](\omega_x, \omega_y)|^2 d\omega_x d\omega_y}{\int\int |[F(I \otimes h)](\omega_x, \omega_y)|^2 d\omega_x d\omega_y},$$

where $$h = \underset{h}{\operatorname{argmax}} f(h)$$

means "h is the argument that maximizes f(h)", that is maximizes the function of h.

A fundamental property of Fourier transforms allows $$[F(Ih)] = [F(I)] \times [F(h)].$$

Further, the image I is often a small object, so [F(I)] is close to constant. Accordingly, the use of the image I can be effectively omitted from both the numerator and the denominator, such that:

$$\frac{\int\int_\Omega |[F(I \otimes h)](\omega_x, \omega_y)|^2 d\omega_x d\omega_y}{\int\int |[F(I \otimes h)](\omega_x, \omega_y)|^2 d\omega_x d\omega_y} \approx \frac{\int\int_\Omega |[F(h)](\omega_x, \omega_y)|^2 d\omega_x d\omega_y}{\int\int |[F(h)](\omega_x, \omega_y)|^2 d\omega_x d\omega_y}$$

Thus, the formula defining the antialiasing filter effectively becomes independent from the image I. Advantageously, being independent from the actual value of any particular image I means that the antialiasing function h will be suitable for all types of images.

As will be appreciated by those of ordinary skill in the art, the optimal solution to this formula is the prolate spheroidal wave function of order zero, which does not have any a closed-form solution. Accordingly, it is desirable to find polynomial filters that also maximize the ratio given above. Take a revolutionary filter, for example, it can be assumes that $$h(r, \theta) = \sum_{k=0}^{M} h_k r^k,$$

where $r \in [0, R], \theta \in [0, 2\pi)$. h is determined whenever M and $h_k (k=0, \ldots, M)$ are given. Accordingly, it would be desirable to express the ratio above as the function of $h_k (k=0, \ldots M)$ so that these coefficients can be found. Thus, $$\int\int_\Omega |[F(h)](\omega_x, \omega_y)|^2 d\omega_x d\omega_y =$$

$$\int\int_\Omega \left| \left[ F\left(\sum_{k=0}^{M} h_k r^k\right) \right](\omega_x, \omega_y) \right|^2 d\omega_x d\omega_y =$$

$$\int\int_\Omega \overline{\left\{ \left[ F\left(\sum_{k=0}^{M} h_k r^k\right) \right](\omega_x, \omega_y) \right\}} \times$$

$$\left\{ \left[ F\left(\sum_{l=0}^{M} h_l r^l\right) \right](\omega_x, \omega_y) \right\} d\omega_x d\omega_y =$$

$$\int\int_\Omega \left\{ \sum_{k=0}^{M} h_k \overline{[F(r^k)](\omega_x, \omega_y)} \right\} \times \left\{ \sum_{l=0}^{M} h_l [F(r^l)](\omega_x, \omega_y) \right\} d\omega_x d\omega_y =$$

$$\int\int_\Omega \sum_{k=0}^{M} h_k \overline{\psi_k} \times \sum_{l=0}^{M} h_l \psi_l d\omega_x d\omega_y =$$

$$\int\int_\Omega \sum_{k=0}^{M} h_k \psi_k \times \sum_{l=0}^{M} h_l \psi_l d\omega_x d\omega_y =$$

$$\int\int_\Omega \sum_{k,l=0}^{M} h_k h_l \psi_k \psi_l d\omega_x d\omega_y =$$

$$\sum_{k,l=0}^{M} h_k h_l \int\int_\Omega \psi_k \psi_l d\omega_x d\omega_y =$$

$$\sum_{k,l=0}^{M} h_k h_l \Psi_{kl}$$

The first equality may be obtained by substituting h with $$\sum_{k=0}^{M} h_k r^k,$$

as initially assumed. The second equality rises from the fundamental property of complex number: $|a|^2 = \bar{a} \times a$, where $|a|$ is the norm of a and $\bar{a}$ is the complex conjugate of a. The third equality is then obtained based upon the linearity property of Fourier transforms, while the fourth equality is obtained by denoting $[F(r^k)](\omega_x, \omega_y)$ by $\psi_k$. The fifth equality follows because $\psi_k$ is real, so a complex conjugate does not take effect. The sixth equality is simply re-writing the previous equation into the double summation form, while the seventh equality may be obtained using the linearity property of integration. The eighth equality is obtained by denoting $$\int\int_\Omega \psi_k \psi_l d\omega_x d\omega_y$$

by $\Psi_{kl}$, and making the same denotation for the denominator. While $\Psi_{kl}$ does not provide closed-form solution, $\Phi_{kl}$ does.

As will now be appreciated by those of ordinary skill in the art, maximization of $\gamma = \Gamma_\Omega / \Gamma$ is equivalent to maximizing $\Gamma_\Omega$ with the constraint that $\Gamma = 1$. The approach for solving the maximization given by the classical Lagragian multiplier:

$$\frac{\partial (\Gamma_\Omega - \lambda(\Gamma - 1))}{\partial h_k} = 0, \text{ and } \frac{\partial (\Gamma_\Omega - \lambda(\Gamma - 1))}{\partial \lambda} = 0.$$

Figure 12:
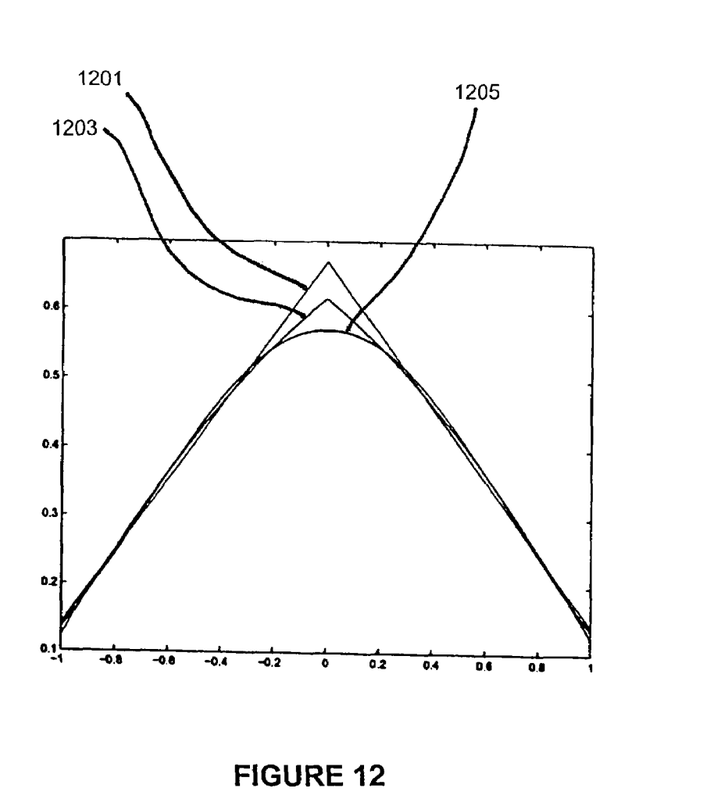
FIG. 12 illustrates the cross sections of the revolutionary polynomial filters according to an embodiment of the invention for three different filter coefficients M.
Figure 13A:
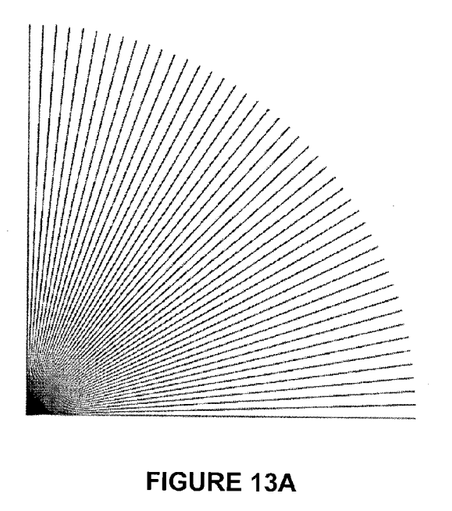
FIGS. 13A-13D illustrate various images rendered using an anti-aliasing technique according to one embodiment of the invention.
Figure 13B:
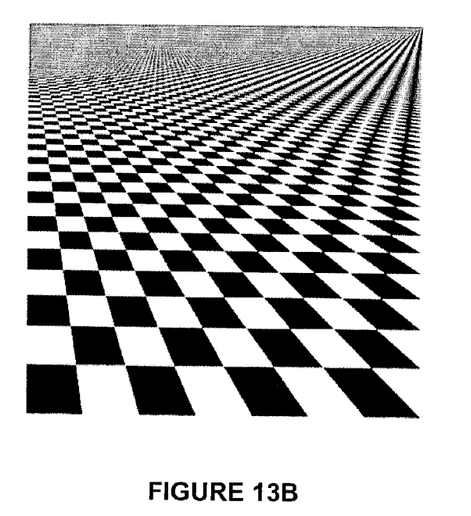
Figure 13C:
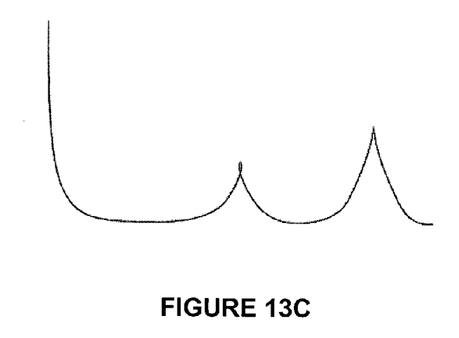
Figure 13D:
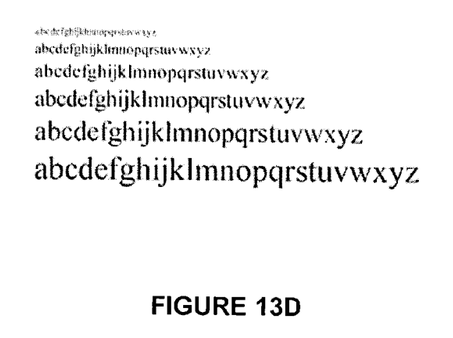

The above system leads to the eigen-vector problem $$\Phi^{-1} \Psi h = \lambda h$$

where $\Phi=(2\pi)^2(\Phi_{kl})$, $\Psi=(\Psi_{kl})$, and $h=(h_0,h_1,h_2 \ldots h_M)^T$. To maximize this eigen-vector, h must be chosen as the eigen-vector that corresponds to the maximal eigen-value of $\Phi^{-1}\Psi$. Thus, for M=3 and R=1, for example, the coefficients are $h_0$=0.56904256713865, $h_1$=0.05056692464147, $h_2$=−0.91026906187835, $h_3$=0.42672641722501, giving an energy concentration of 93.80%. FIG. 12 illustrates a central cross section of the revolutionary filter described above with R=1, where the curve 1201 corresponds to M=1, the curve 1203 corresponds to M=2, and the curve 1205 corresponds to M≧3. Thus, it can be seen that using M=3 provides a high energy concentration.

For embodiments of the invention employing antialiasing filters with square masks, the filter function h is similar. Letting h(x, y)=h(x)h(y), where $$h(x) = \sum_{k=0}^{M} h_k x^{2k},$$

and ($|x|\leq R$). For small R, M=1 is sufficient for a high energy concentration. When R=1, the optimal coefficients are $h_0$=0.68925230898772, $h_1$=−0.56775692696317, giving an energy concentration of 93.01%.

FIGS. 13A-13D illustrate different images using a revolutionary filter with a radius R=1 according to the various embodiments of the invention described above. As apparent from these images, the antialiasing techniques according to the different embodiments of the invention provide high-quality antialiasing for a variety of image types, including line images, a checkerboard image, a Bezier curve and a TrueType fonts.

CONCLUSION

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of rendering an image, comprising:
sampling actual image data for a contour to be rendered;
determining approximate image data for one or more line segments that approximate the contour to be rendered;
filtering the line segments by convoluting the approximate image data with a filter to cause the filter to optimally center spectral energy of the sampled image data on an area in a spectral domain corresponding to sample spacing of the sampled image data in the spatial domain, to produce filtered image data; and
rendering the contour using the filtered image data, wherein the filter is the function h where $$h = \underset{h}{\mathrm{argmax}} \frac{\int\int_\Omega |[F(h)](\omega_x, \omega_y)|^2 d\omega_x d\omega_y}{\int\int |[F(h)](\omega_x, \omega_y)|^2 d\omega_x d\omega_y},$$

[F(h)] denotes the Fourier transform of h and $\Omega$ is the area in the spectral domain corresponding to sample spacing of the sampled image data in the spatial domain.

2. The method recited in claim 1, wherein the area $\Omega=[-\Omega, \Omega]\times[-\Omega, \Omega]$ in the spectral domain, where $\Omega=\pi/T$ and T is the sample spacing for the sampled image data in the spatial domain.

3. The method recited in claim 1, wherein the filter is a revolutionary filter h(r, θ), defined as $$h(r, \theta) = \sum_{k=0}^{M} h_k r^k,$$

wherein r ∈[0, R].

4. The method recited in claim 3, wherein a mask of the revolutionary filter has a radius of 1 pixel.

5. The method recited in claim 1, wherein the filter is a square filter h(x) defined as $$h(x) = \sum_{k=0}^{M} h_k x^{2k},$$

where($|x|\leq R$).

6. The method recited in claim 1, wherein a mask of the square filter has an area of 2 pixels by 2 pixels.

7. A method of rendering an image, comprising:
sampling actual image data for a contour to be rendered;
determining approximate image data for one or more line segments that approximate the contour to be rendered;
filtering the line segments by convoluting the approximate image data with filter to cause the filter to optimally center spectral energy of the sampled image data on an area in a spectral domain corresponding to sample spacing of the sampled image data in the spatial domain, to produce flitered image data;
rendering the contour using the filtered image data; and
determining if a width of the approximate image data is greater than a width of a mask of the filter; and
if the width of the approximate image data is greater than the width of the mask of the filter, filtering edges of the approximate image data.

8. The method recited in claim 7, farther comprising:
scan converting portions of the approximate image data outside of the width of the mask of the filter.

9. A method of rendering an image, comprising:
sampling actual image data for a contour to be rendered;
determining approximate image data for one or more line segments that approximate the contour to be rendered;
filtering the line segments by convoluting approximate image data with a filter to cause the filter to optimally center spectral energy of the sampled image data on an area in a spectral domain corresponding to sample spacing of the sampled image data in the spatial domain, to produce filtered image data;
rendering the contour using the filtered image data; and
determining if one or more line segments intersect within a mask of the filter; and
if one or more line segments intersect with the mask of the filter,
dividing an integral region defined by the mask of the filter and the intersecting line segments into two or more areas without intersections of the line segment, and
filtering each of the two or more areas separately.

10. A tool for rendering an image, comprising:
an original image data store that stores original image data;
a line segment determining module that determines line segment data approximating a contour of the original image data;
a convolution module that convolutes the line segment data with a filter to produce filtered image data wherein the filter is the function h where;

$$h = arg\,\max_{h} \frac{\int\int_{\Omega} |[F(h)](\omega_x \omega_y)|^2\, d\omega_x d\omega_y}{\int\int |[F(h)](\omega_x \omega_y)|^2\, d\omega_x d\omega_y},$$

and
a scan conversion module that scan converts portions of the line segment data that are beyond a width of a mask of the filter from an edge of the line segment data.

11. The tool recited in claim 10, further comprising an accumulation buffer that stores the scan converted portions of the line segment data.

12. The tool recited in claim 10, further comprising an accumulation buffer that stores filtered image data.

13. The tool recited in claim 10, further comprising an integral look-up table that stores values for the convolution of image data with the filter.

14. A method of rendering an image, comprising:
obtaining actual image data for a contour to be rendered;
determining approximate image data for one or more line segments that approximate the contour to be rendered;
filtering the line segments by convoluting the approximate image data with a filter;
rendering the contour using the filtered image data;
determining if a width of the approximate image data is greater than a width of a mask of the filter; and
if the width of the approximate image data is greater than the width of the mask of the filter, filtering edges of the approximate image data.

15. The method recited in claim 14, further comprising:
scan converting portions of the approximate image data outside of the width of the mask of the filter.

16. A method of rendering an image, comprising:
obtaining actual image data for a contour to be rendered;
determining approximate image data for one or more line segments that approximate the contour to be rendered;
filtering the line segments by convoluting the approximate image data with a filter;
rendering the contour using the filtered image data; and
determining if one or more line segments intersect within a mask of the filter; and
if one or more line segments intersect with the mask of the filter,
dividing an integral region defined by the mask of the filter and the intersecting line segments into two or more areas without intersections of the line segment, and
filtering each of the two or more areas separately.

17. A method of rendering an image, comprising:
sampling image data;
filtering the image data by convoluting the image data with a filter to cause the filter to optimally center spectral energy of the sampled image data on an area in a spectral domain corresponding to sample spacing of the sampled image data in the spatial domain, to produce filtered image data; and
rendering the filtered image data,
wherein the filter is the function h where $$h = arg\,\max_{h} \frac{\int\int_{\Omega} |[F(h)](\omega_x \omega_y)|^2\, d\omega_x d\omega_y}{\int\int |[F(h)](\omega_x \omega_y)|^2\, d\omega_x d\omega_y},$$

[F(h)] denotes the Fourier transform of h and Ω is the area in the spectral domain corresponding to sample spacing of the sampled image data in the spatial domain.

18. The method recited in claim 17, wherein the area Ω=[−Ω, Ω]×[−Ω, Ω] in the spectral domain, where Ω=π/T and T is the sample spacing for the sampled image data in the spatial domain.

19. A method of rendering an image, comprising:
sampling image data;
filtering the image data by convoluting the image data with a filter to cause the filter to optimally center spectral energy of the sampled image data on an area in a spectral domain corresponding to sample spacing of the sampled image data in the spatial domain, to produce filtered image data; and
rendering the filtered image data,
wherein the filter is a revolutionary filter h(r, θ), defined as $$h(r, \theta) = \sum_{k=0}^{M} h_k r^k,$$

wherein r ∈[0, R].

20. The method recited in claim 19, wherein a mask of the revolutionary filter has a radius of 1 pixel.

21. A method of rendering an image, comprising:
sampling image data;
filtering the image by convoluting the image data with a filter to cause the filter to optimally center spectral energy of the sampled image data on an area in a spectral domain corresponding to sample spacing of the sampled image data in the spatial domain, to produce filtered image data; and
rendering the filtered image data,
wherein the filter is a square filter h(x) defined as $$h(x) = \sum_{k=0}^{M} h_k x^{2k},$$

where (|x|≦R).

22. The method recited in claim 21, wherein a mask of the square filter has an area of 2 pixels by 2 pixels.

* * * * *